United States Patent Office 3,182,057
Patented May 4, 1965

3,182,057
NEW 16-SUBSTITUTED-19-NORPREGNA-1,3,5(10),
6,8-PENTAEN-20-ONES
Milton David Heller, New City, N.Y., Robert Herman Lenhard, Ridgefield Park, N.J., and Seymour Bernstein, New City, N.Y., assignors to American Cyanamid Company, Stamford, Conn., a corporation of Maine
No Drawing. Filed Oct. 31, 1963, Ser. No. 320,559
9 Claims. (Cl. 260—239.55)

This invention relates to new aromatic steriods. More particularly, it relates to novel steroids of the pregnane series having aromatic rings A and B and methods of preparing the same.

The novel steroids of the present invention may be illustrated by the following formula;

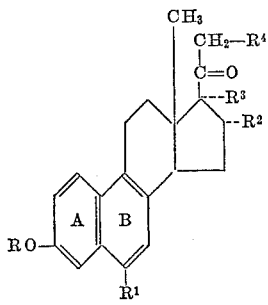

wherein R is selected from the group consisting of hydrogen and lower alkanoyl; $R^1$ is selected from the group consisting of hydrogen, fluoromethyl, difluoromethyl and trifluoromethyl; $R^2$ is selected from the group consisting of hydroxyl and lower alkanoyloxy; $R^3$ is hydroxyl, and $R^2$, $R^3$ taken together represent lower alkylidenedioxy and $R^4$ is selected from the group consisting of halogen, hydroxyl, lower alkanoyloxy, and lower alkylsulfonyloxy.

The novel steroids of the present invention are substantially insoluble in water and somewhat soluble in the usual organic solvents.

The starting materials in preparing the present compounds may be illustrated by the formula;

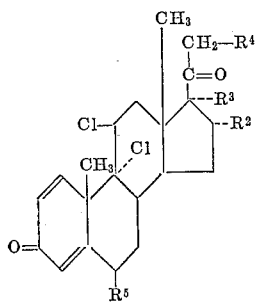

wherein $R^2$, $R^3$, and $R^4$ are as defined above and $R^5$ is hydrogen, ($\alpha$)-fluoromethyl, ($\alpha$)-difluoromethyl, and ($\alpha$)-trifluoromethyl.

The specific intermediates found useful in the process of this invention include:

16$\alpha$,21-diacetoxy-9$\alpha$,11$\beta$-dichloro-17$\alpha$-hydroxypregna-1,4-diene-3,20-dione;
21-acetoxy-9$\alpha$,11$\beta$-dichloro-16$\alpha$,17$\alpha$-isopropylidenedioxy-pregna-1,4-diene-3,20-dione;
9$\alpha$,11$\beta$-dichloro-21-hydroxy-16$\alpha$,17$\alpha$-isopropylidenedioxy-pregna-1,4-diene-3,20-dione;
21-acetoxy-9$\alpha$11$\beta$-dichloro-6$\alpha$-fluoromethyl-16$\alpha$,17$\alpha$-isopropylidenedioxy-pregna-1,4-diene-3,20-dione;
21-acetoxy-9$\alpha$,11$\beta$-dichloro-6$\alpha$-difluoromethyl-16$\alpha$,17$\alpha$-isopropylidenedioxypregna-1,4-diene-3,20-dione;
21-acetoxy-16$\alpha$,17$\alpha$-propylidenedioxy-9$\alpha$,11$\beta$-dichloro-pregna-1,4-diene-3,20-dione;
21-methanesulfonyloxy-9$\alpha$,11$\beta$-dichloro-16$\alpha$,17$\alpha$-isopropylidenedioxypregna-1,4-diene-3,20-dione;
and the like.

The process of the present invention is carried out by contacting the starting material with a weak base. The weak base may be for example dimethylformamide, pyridine, collidine, lutidine and the like. The temperature of the reaction may vary from about 15° C. to about 160° C. The time for completing the reaction will depend on the temperature used and may vary from about one-half hour to about 72 hours. After completion of the reaction, the desired steroids may be recovered by methods well known in the steroid art.

The compounds of the present invention are active in reducing cholesterol and therefore have utility as hypocholesteremic agents. The compounds also have no appreciable activity as estrogens. This lack of estrogenic activity makes them useful as hypocholesteremic agents without the undesirable estrogenic feminizing side-effects.

The following examples illustrate in detail the preparation of representative steroids of the present invention.

EXAMPLE 1

*Preparation of 9$\alpha$,11$\beta$-dichloro-16$\alpha$,17$\alpha$-isopropylidene-dioxy-21-methanesulfonyloxypregna-1,4-diene-3,20-dione*

A solution of 9$\alpha$,11$\beta$-dichloro-21-hydroxy-16$\alpha$,17$\alpha$-isopropylidenedioxypregna-1,4-diene-3,20-dione (0.72 g.) [Steroids, 1, 331 (1963)] in cold pyridine (7 ml.) is treated with methanesulfonyl chloride (0.15 ml.) and allowed to stand at −5° C. for 16.5 hours. The reaction mixture is then poured into ice water and the resultant precipitate (0.75 g., melting point 212°–214° C., dec.) is filtered and washed well with water. Crystallization from acetone-hexane gives the product of the example (0.65 g., melting point 223.5°–226° C., dec.). A portion of the latter is crystallized three more times from the same solvents to give melting point 232°–234° C., dec.

EXAMPLE 2

*Preparation of 21-chloro-3-hydroxy-16$\alpha$,17$\alpha$-isopropyli-dene-dioxy-19-norpregna-1,3,5(10),6,8-pentaen-20-one*

A solution of 9$\alpha$,11$\beta$-dichloro-16$\alpha$,17$\alpha$-isopropylidene-dioxy-21-methanesulfonyloxypregna-1,4-diene-3,20-dione (0.50 g.) and lithium chloride (0.14 g.) in dimethylformamide (25 ml.) is heated under reflux for 0.5 hour. The yellow solution is concentrated under reduced pressure to near dryness, water is added and the product is filtered and washed with water to give an amorphous yellow solid (0.38 g.), melting point 90°–150° C. The product is soluble in 10% sodium hydroxide solution and exhibited an equilenin-type absorption in the ultraviolet. A portion (0365 g.) is dissolved in benzene (ca. 10 ml.) and adsorbed on a synthetic magnesium silicate (14.5 g.) column. Elution with 3% acetone-petroleum ether (boiling point 60–70°) gives the product of the example (0.264 g); $\lambda_{max}$ 231 m$\mu$ ($\epsilon$68,900), 269m$\mu$ ($\epsilon$6570), 281 m$\mu$ ($\epsilon$6570), 293 m$\mu$ ($\epsilon$4800), 328 m$\mu$ ($\epsilon$3200) and 342 m$\mu$ ($\epsilon$3200). The product, obtained as a white amorphous solid, is apparently liable to air or light. A solution of the product (0.13 g.) in pyridine (2 ml.) and acetic anhydride (1 ml.) is allowed to stand at room temperature for 19 hours. The solution is poured into ice water, the precipitate is filtered and washed with water to give (0.127 g.) of product, melting point 200°–203.5° C. Two crystallization from acetone-hexane gives the analytical sample (0.109 g.) of 3-acetoxy-21-chloro-16α,17α-isopropylidene - dioxy - 19-norpregna-1,3,5,(10),6,8-pentaen - 20 - one, melting point 205°–207° C.

EXAMPLE 3

*Preparation of 16α,21-diacetoxy-3,17α-dihydroxy-19-norpregna-1,3,5(10),6,8,-pentaen-20-one*

One gram of 16α,21-diacetoxy-9α,11β-dichloro-17α-hydroxypregna - 1,4 - diene - 3,20-dione [Steroids, 1, 331 (1963)] in 50 ml. of dimethylformamide is reacted and worked up in the manner described in Example 2 above. The crude product is isolated, chromatographed, and crystallized from acetone-hexane to give 16α,21-diacetoxy-3,17α-dihydroxy-19-norpregna - 1,3,5(10),6,8 - pentaen-20-one.

Saponification of the product of the example with potassium carbonate in methanol followed by acidification gives 3,16α,17α,21-tetrahydroxy-19-norpregna-1,3,5(10),6,8-pentaen-20-one.

EXAMPLE 4

*Preparation of 21-acetoxy-3-hydroxy-16α,17α-isopropylidenedioxy-19-norpregna-1,3,5,(10),6,8-pentaen-20-one*

One gram of 21-acetoxy-9α,11β-dichloro-16α,17α - isopropylidenedioxypregna-1,4-diene-3,20-dione [Steroids, 1, 331 (1963)] in 50 ml. of dimethylformamide is reacted and worked up essentially in the manner of Example 2 above. The crude product is isolated, chromatographed, and crystallized from acetone-hexane to give 21-acetoxy-3-hydroxy-16α,17α-isopropylidenedioxy-19-norpregna - 1,3,5,(10),6,8-pentaen-20-one.

Saponification of the product of the example with potassium carbonate in methanol at room temperature followed by acidification gives 3,21-dihydroxy-16α,17α-isopropylidenedioxy-19-norpregna-1,3,5(10),6,8, - pentaen-20-one.

EXAMPLE 5

*Preparation of 21-acetoxy-6-fluoromethyl-3-hydroxy-16α,17α - isopropylidenedioxy-19-norpregna-1,3,5,(10),6,8-pentaen-20-one*

Following essentially the procedure of Example 2, the steroid 21-acetoxy-9α,11β-dichloro-6α-fluoromethyl - 16α,17α-isopropylidenedioxypregna-1,4-diene-3,20-dione (U.S. Patent 3,038898) on being heated in dimethylformamide is converted into the product of the example.

EXAMPLE 6

*Preparation of 21 - acetoxy-6-difluoromethyl-3-hydroxy-16α,17α - isopropylidenedioxy-19-norpregna-1,3,5(10), 6,8-pentaen-20-one*

Following essentially the procedure of Example 2, the steroid 21-acetoxy-9α,11β-dichloro-6α-difluoromethyl-16α,17α-isopropylidenedioxypregna-1,4-diene-3,20-dione (U.S. Patent 3,038,898) on being heated in dimethylformamide is converted into the product of the example.

EXAMPLE 7

*Preparation of 21-acetoxy-6-trifluoromethyl-3-hydroxy-16α,17α - isopropylidenedioxy-19-norpregna-1,3,5(10), 6,8-pentaen-20-one*

Following essentially the procedure of Example 2, the steroid 21-acetoxy - 9α,11β - dichloro-6α-trifluoromethyl-16α,17α-isopropylidenedioxypregna-1,4-diene-3,20 - dione (U.S. Patent 3,038,898) on being heated in dimethylformamide is converted into the product of the example.

We claim:

1. A steroid of the formula:

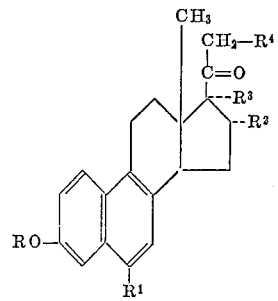

wherein R is selected from the group consisting of hydrogen and lower alkanoyl; $R^1$ is selected from the group consisting of hydrogen, fluoromethyl, difluoromethyl and trifluoromethyl; $R^2$ is selected from the group consisting of hydroxyl and lower alkanoyloxy; $R^3$ is hydroxyl and $R^2$, $R^3$ taken together represent lower alkylidenedioxy and $R^4$ is selected from the group consisting of halogen, hydroxyl, lower alkanoyloxy and lower alkylsulfonyloxy.

2. The compound, 3,16α,17α,21-tetrahydroxy-19-norpregna-1,3,5(10),6,8-pentaen-20-one.

3. The compound 16α,21-diacetoxy-3,17α-dihydroxy-19-norpregna-1,3,5(10),6,8-pentaen-20-one.

4. The compound 21-acetoxy-3-hydroxy-16α,17α-isopropylidenedioxy - 19 - norpregna - 1,3,5(10),6,8-pentaen-20-one.

5. The compound 3,21-dihydroxy-16α,17α-isopropylidenedioxy-19-norpregna-1,3,5(10),6,8-pentaen-20-one.

6. The compound 21-chloro-3-hydroxy - 16α,17α - isopropylidenedioxy - 19 - norpregna - 1,3,5(10),6,8 - pentaen-20-one.

7. The compound 21 - acetoxy - 6 - fluoromethyl-3-hydroxy - 16α,17α - isopropylidenedioxy - 19 - norpregna-1,3,5(10),6,8-pentaen-20-one.

8. The compound 21-acetoxy-6-difluoromethyl - 3 - hydroxy - 16α,17α - isopropylidenedioxy - 19 - norpregna-1,3,5(10),6,8-pentaen-20-one.

9. The compound 21-acetoxy-6-trifluoromethyl-3-hydroxy - 16α,17α - isopropylidenedioxy - 19 - norpregna-1,3,5(10),6,8-pentaen-20-one.

No references cited.

LEWIS GOTTS, *Primary Examiner.*